United States Patent [19]

Dexter

[11] Patent Number: 4,497,388
[45] Date of Patent: Feb. 5, 1985

[54] PULSATION DAMPENER AND ACOUSTIC ATTENUATOR

[75] Inventor: Edwin Dexter, South Brooksville, Me.

[73] Assignee: Gaulin Corporation, Everett, Mass.

[21] Appl. No.: 327,131

[22] Filed: Dec. 3, 1981

Related U.S. Application Data

[63] Continuation-in-part of Ser. No. 296,228, Aug. 25, 1981, abandoned.

[51] Int. Cl.³ .............................................. F16L 55/02
[52] U.S. Cl. ................................... 181/233; 181/237; 181/243; 181/256; 181/269; 138/30
[58] Field of Search ................ 181/227, 230, 233–234, 181/248, 252, 256–258, 271, 243, 269, 237; 138/26, 30

[56] References Cited

U.S. PATENT DOCUMENTS

| | | | |
|---|---|---|---|
| 2,543,585 | 2/1951 | Miller | 138/30 |
| 2,712,831 | 7/1955 | Day | 138/26 |
| 2,878,835 | 3/1959 | Peterson | 138/30 |
| 2,968,319 | 1/1961 | Ball | 138/30 |
| 3,003,522 | 10/1961 | Rohacs | 138/30 |
| 3,165,166 | 1/1965 | Hall | 181/233 |
| 3,473,565 | 10/1969 | Blendermann | 138/30 X |
| 3,486,530 | 12/1969 | Mercier | 138/30 |
| 3,621,882 | 11/1971 | Kupiec | 138/30 |
| 3,625,242 | 12/1971 | Ostwald | 138/30 |
| 3,893,485 | 7/1975 | Loukonen | 138/30 |
| 4,032,265 | 6/1977 | Miller | 417/540 |

Primary Examiner—Benjamin R. Fuller
Attorney, Agent, or Firm—Hamilton, Brook, Smith & Reynolds

[57] ABSTRACT

A pulsation dampener and acoustic attenuator for hydraulic systems is designed to be inserted into a liquid flow line. The dampener is a flow-through device with a pressurized bladder restrained within a perforated sleeve. The arrangement of inlet/outlet ports, the bladder, and the screen provides means for dampening flow pulsations in the supply system to effect a more uniform flow and to attenuate acoustic noises reverberating within the system. The dampener provides for self-cleaning due to the flow of the liquid and is thus suitable for sanitary applications. Further, the bladder may be readily removed through one end of the dampener without otherwise removing the dampener from the pipeline in order to examine or replace the bladder.

15 Claims, 4 Drawing Figures

PULSATION DAMPENER AND ACOUSTIC ATTENUATOR

RELATED PATENT APPLICATIONS

This is a continuation-in-part of U.S. application Ser. No. 296,228, filed Aug. 25, 1981, now abandoned for a pulsation dampener and acoustic attenuator.

FIELD OF THE INVENTION

This invention relates to hydraulic pulsation dampeners and acoustic attenuators of the type in which the hydraulic fluid is separated from a pressurized gas by a diaphragm. The invention has particular application to sanitary food-processing systems.

BACKGROUND

Liquid processing industries, especially those in food processing such as milk homogenization, are often troubled with vibration in processing pipelines where transfer pumps are utilized. Two distinctly different types of pressure fluctuations are created by most types of transfer pumps: low frequency fluctuations due to the pulsating flow and a higher frequency acoustic "ring", or water hammer, associated with sudden changes in flow due to the pump's valve action or to process valve action. The magnitude and frequency of the pressure fluctuations due to these two types of flow pulsations is determined by the number and displacement of the pump plungers and the speed of the pump.

The water hammer pulses occur at the beginning of each suction stroke when the discharge valve closure abruptly stops the backflow into the plunger chamber. At the end of the pumping stroke the discharge valve is still open, and there is a momentary backflow into the plunger chamber as the plunger starts on the suction stroke. When the discharge valve closes, there is a sudden deceleration of the fluid moving toward the valve. The fluid begins to "back up" at the discharge valve, resulting in a pressure wave which moves out toward the process equipment at the speed of sound (normally about 4,000 feet per second in the fluid medium) and, subsequently, is reflected repeatedly throughout the system resulting in a ringing effect.

For sanitary application, the flow paths through an acoustic dampener must act to sweep the unit of old product, not leaving any product to stagnate. Such a design allows for what is known as "clean in place" performance.

An object of this invention is to provide a pulsation dampener and acoustic attenuator suitable for sanitary applications.

A further object of this invention is to provide a hydraulic dampener which may be readily disassembled to facilitate inspection, cleaning or replacement of a diaphragm within the assembly.

DISCLOSURE OF THE INVENTION

A flow through pipeline pulsation dampener is provided which may be mounted in series with a pipeline for continuous flow of liquid through the dampener. In its preferred form, the dampener has inlet/outlet ports near each end of a housing. Each port is connected with the pipeline. A restraining screen is positioned within the housing, and a deformable bladder is restrained within that screen. The bladder contains a pressurized, compressable fluid. The bladder is attached to only one end of the housing and is readily removable from the housing through that end while the housing remains connected in the pipeline.

Preferably, an inlet/outlet port extends through a side of an extended housing to cause a significant change in direction of liquid flow at that port. The other inlet/outlet port is centered at the opposite end of the housing and an annular orifice is formed between the housing and a closed end of the cylindrical screen assembly. Fins may be provided on that closed end of the screen to center it within the housing. Preferably, a valve extends from the bladder through the end of the housing for filling the bladder with pressurized gas. The entire bladder and screen assembly may be mounted to an end wall of the housing which is clamped to the main portion of the housing for easy removal.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENT OF THE INVENTION

Figure 1:
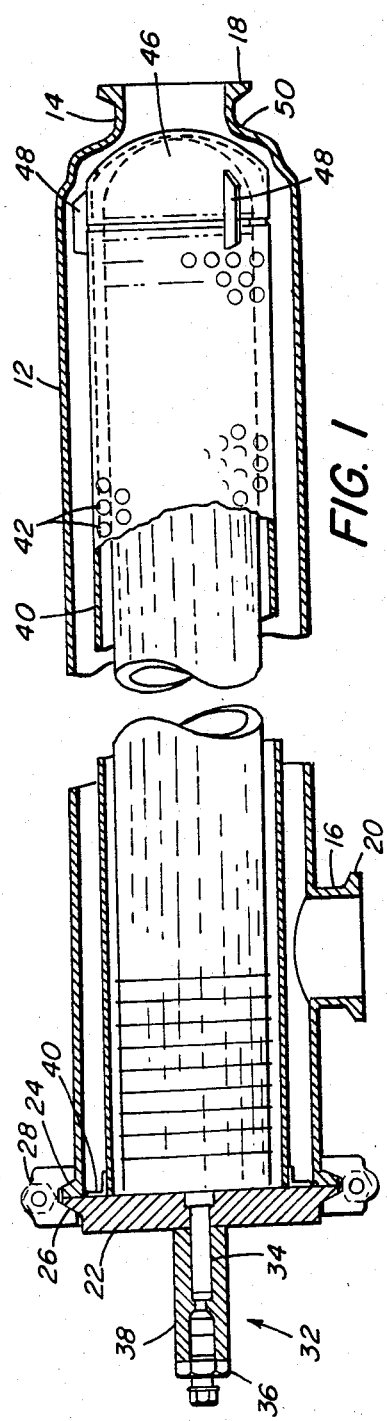
FIG. 1 is a longitudinal cross-sectional view of a pulsation dampener embodying this invention.
Figure 2:
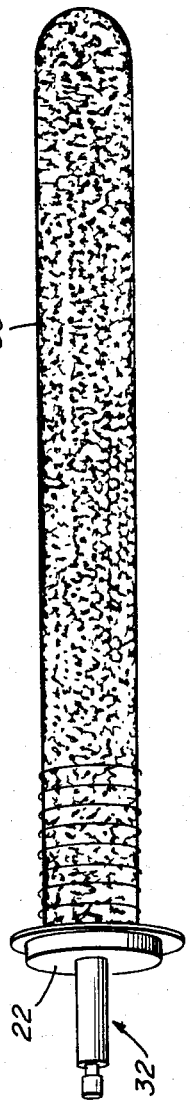
FIG. 2 is a side view of the bladder which is mounted at the center of the pulsation dampener of FIG. 1.
Figure 3:
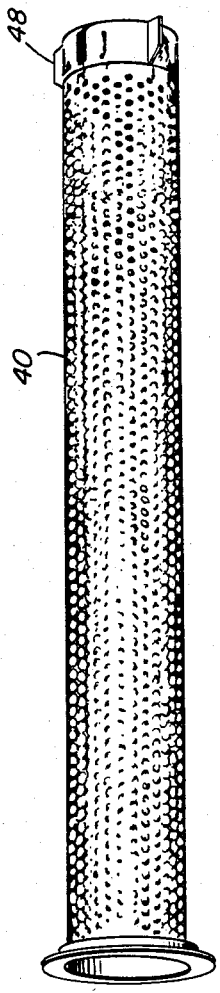
FIG. 3 is a side view of the restraining screen which surrounds the bladder in the pulsation dampener of FIG. 1.
Figure 4:
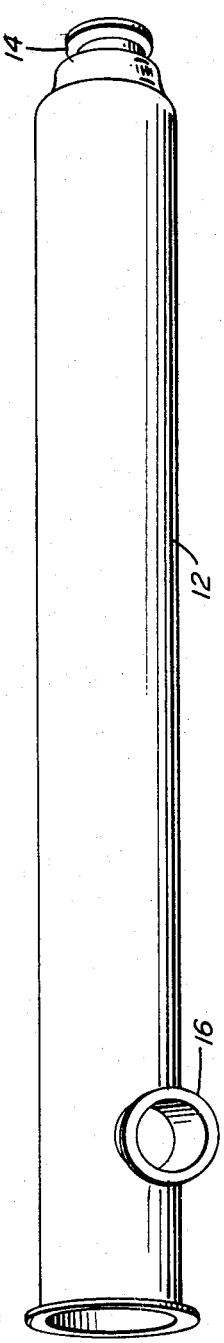
FIG. 4 is a side view of the outer housing of the pulsation dampener of FIG. 1.

In a pulsation dampener shown in the drawings, an outer cylindrical housing is provided with inlet/outlet ports 14 and 16. Each port includes a ferrule for a two inch "Vee" clamp which allows for ready clamping of the housing in series with a system pipeline. Preferably, the port 14 serves as the inlet, but for convenience the port 16 may serve as the inlet. The housing is of stainless steel and is about 26 inches long and four inches in diameter.

The end of the housing opposite to the port 14 is closed by an adapter plate 22. Each of the housing 12 and adapter plate 22 has a respective ferrule 24, 26 by which the two can be clamped together by a Vee clamp 28. A molded bladder 30 is mounted to the adapter plate 22 by a valve stem assembly 32. A stem 34 is joined to the bladder 30 after the bladder is molded. That stem is held in place by a valve assembly 36 and an adapter tube 38. The valve 36 is a pneumatic valve similar to that used on vehicle tires.

The bladder is preferably of Buna-N, a rubber-like elastomeric material which has been found suitable for use by the food industry.

With the adapter plate 22 clamped against the housing 12, it also holds a 2⅜ inch diameter restraining screen 40 in place. That screen is in the form of a perforated sleeve with perforations 42. With the bladder charged by pressurized air or other fluid, and with no opposing pressure from a hydraulic fluid in the pipeline, the bladder 30 expands to fill the entire volume of the screen and is restrained at that volume.

The screen is held against axial movement by a flange 44 which butts against the adapter plate 22 and extends radially beyond the inner surface of the housing 12. At the opposite end of the screen near the port 14, the closed screen nose 46 is centered by three radial fins 48.

To use the pulsation dampener, the inlet/outlet ports 14 and 16 are clamped to the pipeline such that the dampener serves as an in-series portion of that pipeline. The bladder and screen assembly may then be inserted into the housing 12 and securely clamped by the clamp 28. The bladder can then be filled through the valve 36 to a desired pressure. The pulsation dampener is then ready for operation.

With the port 14 connected as the inlet port, pulsating liquid entering the port is directed radially by the closed nose 46 of the screen 40. The region between the nose 46 and the neck 50 of the port provides an annular orifice. Liquid passing through that orifice expands as it enters the main body of the housing 12. The liquid continues to flow through the length of the extended housing and then passes out through the port 16. Port 16 extends through a side of the housing to cause a significant change in direction of the liquid flow at that port.

With sufficient pressure, the liquid flowing through the housing 12 presses through the perforations 42 in the screen to compress the bladder 30. This increases the effective cross-sectional area of the liquid flowing through the pulsation dampener. As the pressure of the liquid increases, the bladder shrinks against the force of the pressurized gas within the bladder and as the pressure decreases the bladder expands. The bladder thus serves as an energy storage device which reduces the degree of pressure fluctuations. The pressure within the bladder is set such that, during normal operation of the system, the bladder is compressed away from the screen so that no friction occurs between the screen and the bladder.

The pulsation dampener described reduces pulsations of both high and low frequency by means of sudden expansion of flow area, diffusion, compliance of the bladder, and a nonsymmetrical inlet/outlet port which is not visible acoustically from the opposite port. Specifically, after the fluid passes around the nose of the screen assembly it enters the screen section where the flow cross-section is much larger than around the nose of the screen. The average flow velocity is therefore decreased. By the same action the acoustic waves spread out and thereby diminish in amplitude. Further, some of the flow enters the inside of the screen and is diffused by passage through the holes to diminish the acoustic pressure amplitude. Finally, with the discharge from the side, the flow becomes confused, and this also serves to diffuse the noise.

The flow-through feature of the pulsation dampener along with the confused flow within the dampener provides for continual washing of the interior of the dampener so that no liquid remains stagnant within the assembly. This action has been demonstrated even with products which have high solids content.

Without in any way effecting the connection of the housing 12 to the system pipeline, the bladder 30 can be readily removed from the pulsation dampener for replacement as necessary. It can readily be seen that replacement of the bladder would be a quick and easy matter. One need only remove bladder 30 from the housing.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A pipeline pulsation dampener of the type mounted in series with a pipeline for flow of liquid through the dampener, comprising:
    a housing comprising a single tubular member having ports for connecting the housing in series with the pipeline one port extending through a side of the housing near a first end thereof to cause a significant change in direction of liquid flow at that port and the other port being centered at a second end of the housing;
    a restraining screen member enclosed entirely within the housing with an annular orifice provided at the second port between the housing and a closed nose of the restraining screen; and
    a deformable bladder, within the screen, containing a pressurized fluid, the bladder being attached to only the first end of the housing and being removable from the housing through that end while the housing is connected at the ports to the pipeline.

2. A pipeline pulsation dampener as claimed in claim 1 further comprising a pneumatic valve extending from the bladder and protruding through the end of the housing for filling the bladder within the assembly with pressurized gas.

3. A pipeline pulsation dampener as claimed in claim 1 or 2 wherein the bladder is mounted to an end plate which is held to the main body of the housing by means of a readily removable clamp.

4. A pipeline pulsation dampener as claimed in claim 1 further comprising radial fins between the housing and the restraining screen to center the screen within the housing.

5. A pipeline pulsation dampener of the type mounted in series with a pipeline for flow of liquid through the dampener, comprising:
    an extended housing comprising a single tubular member having a port at and near each end thereof for connecting the housing in series with the pipeline, one of the ports defining an inlet and the other defining an outlet, at least one of the ports being through a side of the housing to cause a significant change in direction of liquid flow at that port;
    an extended screen member within the housing, the screen member having a perforated and non-perforated portion, the non-perforated portion thereof facing the inlet port to deflect liquid entering the housing through that port; and
    an extended deformable bladder, containing a pressurized fluid, within the screen member and extending along a substantial length of the perforated portion of the screen member.

6. A pipeline pulsation dampener as claimed in claim 5 wherein the bladder is attached to only one end of the housing and is removable from the housing through that end while the housing is connected at one of the ports to the pipeline.

7. A pipeline pulsation dampener as claimed in claim 6 further comprising a pneumatic valve extending from the bladder and protruding through the end of the housing for filling the bladder within the assembly with pressurized gas.

8. A pipeline pulsation dampener as claimed in claim 6 or 7 wherein the bladder is mounted to an end plate which is held to the main body of the housing by means of a readily removable clamp.

9. A pipeline pulsation dampener as claimed in claim 6 wherein the other of said ports is centered at the opposite end of the housing and an annular orifice is provided at that port between the housing and a closed nose of the restraining screen.

10. A pipeline pulsation dampener as claimed in claim 9 further comprising radial fins between the housing and the restraining screen to center the screen within the housing.

11. A pipeline pulsation dampener of the type mounted in series with the pipeline for flow of liquid through the dampener, comprising:
   an extended housing having ports for connecting the housing in series with the pipeline, one of the ports being through a side of the housing near one end thereof and the other port being centered at the opposite end of the housing;
   an extended restraining screen within the housing, the screen having a closed nose adjacent to the centered port; and
   a deformable bladder, within the screen, containing a pressurized fluid, the bladder being attached to only one end of the housing opposite to the centered port and being removable from the housing through that end while the housing is connected at the ports to the pipeline.

12. A pipeline pulsation dampener as claimed in claim 11 further comprising a pneumatic valve extending from the bladder and protruding through the end of the housing for filling the bladder within the assembly with pressurized gas.

13. A pipeline pulsation dampener as claimed in claim 11 or 12 wherein the bladder is mounted to an end plate which is held to the main body of the housing by means of a readily removable clamp.

14. A pipeline pulsation dampener as claimed in claim 11 further comprising radial fins between the housing and the restraining screen to center the screen within the housing.

15. A pipeline pulsation dampener of the type mounted in series with the pipeline for flow of liquid through the dampener, comprising:
   an extended housing having ports for connecting the housing in series with the pipeline, one of the ports being through a side of the housing near one end thereof and the other port being centered at the opposite end of the housing;
   an extended restraining screen within the housing, the screen having a closed nose adjacent to the centered port and radial fins at that nose for centering the screen within the housing; and
   a deformable, elastomeric bladder, within the screen, containing a pressurized fluid, the bladder being attached to a plate clamped to the main body of the housing at the end of the housing opposite to the centered port by means of a valve stem assembly, and the bladder being removable from the housing through that end while the housing is connected at the ports to the pipeline.

* * * * *